US 8,095,495 B2

(12) United States Patent
Clark et al.

(10) Patent No.: US 8,095,495 B2
(45) Date of Patent: Jan. 10, 2012

(54) EXCHANGE OF SYNCRONIZATION DATA AND METADATA

(75) Inventors: Michael Ray Clark, Redmond, WA (US); Moe Khosravy, Kirkland, WA (US); Oliver Lee, Redmond, WA (US); Lev Novik, Bellevue, WA (US); Neil Leonard Padgett, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 711 days.

(21) Appl. No.: 11/861,211

(22) Filed: Sep. 25, 2007

(65) Prior Publication Data

US 2009/0083210 A1   Mar. 26, 2009

(51) Int. Cl.
*G06N 5/00* (2006.01)
(52) U.S. Cl. .......................... 706/48; 706/45
(58) Field of Classification Search ............ 706/48, 706/45
See application file for complete search history.

(56) References Cited

U.S. PATENT DOCUMENTS

| | | | |
|---|---|---|---|
| 6,493,720 | B1 | 12/2002 | Chu et al. |
| 6,625,621 | B2 | 9/2003 | Tan et al. |
| 6,671,757 | B1 | 12/2003 | Multer et al. |
| 7,024,430 | B1 | 4/2006 | Ingraham et al. |
| 2002/0059465 | A1 | 5/2002 | Kim |
| 2004/0003007 | A1 | 1/2004 | Prall et al. |
| 2005/0015436 | A1 | 1/2005 | Singh et al. |
| 2005/0181790 | A1 | 8/2005 | Yach et al. |
| 2005/0246389 | A1 | 11/2005 | Shah et al. |
| 2006/0020686 | A1 | 1/2006 | Liss et al. |
| 2006/0106879 | A1 | 5/2006 | Zondervan et al. |
| 2006/0215569 | A1 | 9/2006 | Khosravy et al. |
| 2006/0224775 | A1 | 10/2006 | Lee et al. |

FOREIGN PATENT DOCUMENTS

WO    0054525 A1   9/2000
WO    2005031543 A2   4/2005

OTHER PUBLICATIONS

Olias-Sanz, A Flexible, Scalable, Distributed, Fault Tolerant Architecture for the Collection and Dissemination of Multimodal Traffic-Related Information, Masters Thesis, University of Dublin, Sep. 15, 2003, pp. 1-109.*
International Search Report, Written Opinion dated Apr. 15, 2009 mailed for PCT Application U.S. Serial No. PCT/US2008/077396, 12 pages.
Maik Groenewegen. Informatica PowerCenter Metadata Exchange Options. Dec. 16, 2005. http://www.informatica.com/products/powercenter/options/metadata_exchange/infa_ds_metadata_i50764_6594_12162005.pdf.
J. Nathan Fostera, et al. Exploiting Schemas in Data Synchronization. Jun. 4, 2007. http://www.sciencedirect.com/science?_ob=ArticleURL&_udi=B6WJ0-4MJBTXT-3&_user=10&_coverDate=06%2F30%2F2007&_rdoc=1&fmt=&_orig=search&_sort=d&view=c&_acct=C000050221&_version=1&_urlVersion=0&_userid=10&md5=8376df1f967cab970b72c8a170e7508c.

* cited by examiner

*Primary Examiner* — Wilbert L Starks

(57) ABSTRACT

Systems and methods that disclose alternative patterns for exchange of synchronization data and/or metadata, e.g., 'knowledge', to enhance performance of synchronization processes are disclosed. Accordingly, the innovation discloses synchronization mechanisms that employ exchange of data and metadata to alleviate a requirement of a complete 'round-trip' when synchronizing data. 'Knowledge' can be provided which informs a provider of data changes, modifications, additions or deletions. The 'knowledge' can lower expense and/or increase efficiencies of the synchronization exchanges by enabling informed decision-making related to enumerating changes within the synchronization processes.

17 Claims, 12 Drawing Sheets

EXCHANGE OF SYNCRONIZATION DATA AND METADATA

BACKGROUND

Today, individuals use a variety of computer devices or systems on a regular basis. Accordingly, it is often desirous to keep information synchronized between devices. For example, individuals often have a desktop personal computer (PC) and/or associated file server with which they interact at work. They oftentimes also have a notebook/laptop computer for working away from the office as well as one or more desktop computers at home. Furthermore, they may have handheld computers such as a personal digital assistant (PDA), pocket PC, mobile phone (e.g., smart-phone) and/or other portable device they utilize for organizational, communication, and/or entertainment purposes. It is typically desirous for at least some data to be copied or synchronized between multiple devices to enable convenient access thereto.

For instance, often a user copies (or synchronizes) files from a desktop computer or file server to a portable computer or device for use while the user is away from their office. Thereafter, the user likely modifies or adds some new files while away from the office and subsequently desires to copy (or synchronize) these files to the desktop computer or file server when they return to the office. Similarly, in another example, users may wish to copy pictures or music from one device to another (e.g., computer to MP3 player, digital camera to computer . . . ). Still further, users may demand that personal preferences and contacts (e.g., address book) be maintained across all or a subset of their computers. Thus, many scenarios exist where certain files need to be synchronized across multiple computers or devices.

In its simplest form, synchronization is merely the task of causing designated files or data from multiple devices or systems to become the same or consistent across all or a subset of the devices. Typically, this means that the most current file versions are used to copy to a store. This process is most often automated by two-way, peer-to-peer, synchronization software applications. In particular, upon receipt, a synchronization application can analyze a set of information and detect file changes or additions in comparison to resident data within a first device. Thereafter, altered or new data can be copied or replicated to a second device communicatively coupled to the first device, for instance via a hard-wired or wireless connection. Of course, conflict detection and/or resolution schemes can be applied to ensure accuracy of data.

This causes the files on the first device to be synchronized with files on the second device. Synchronization can also be performed remotely by accessing a network having a first device such as desktop computer coupled thereto. A second device such as a second desktop computer or laptop computer can be synchronized with the first device utilizing synchronization software. Unfortunately, today's synchronization applications do not conform to today's ever-growing desire to increase mobility. In other words, conventional synchronization applications require an excessive amount of bandwidth as complete sets of information are often sent from one device to another in order to determine changes by which to synchronize.

SUMMARY

The following presents a simplified summary of the innovation in order to provide a basic understanding of some aspects of the innovation. This summary is not an extensive overview of the innovation. It is not intended to identify key/critical elements of the innovation or to delineate the scope of the innovation. Its sole purpose is to present some concepts of the innovation in a simplified form as a prelude to the more detailed description that is presented later.

The innovation disclosed and claimed herein, in one aspect thereof, comprises a system that enables data synchronization while reducing transmitted traffic. In accordance therewith, the innovation can accomplish synchronization without a need for a complete 'round-trip' of synchronization as used in conventional devices. Rather, the systems and methods disclosed herein employ the exchange of data and metadata to facilitate sophisticated and intelligent delivery of information.

In aspects, 'knowledge' can be provided which informs a provider of data changes, modifications, additions or deletions. This 'knowledge' can be actual knowledge or some fabricated 'stand-in' knowledge, either of which can lower expense and increase efficiencies of the synchronization exchanges.

Effectively, the innovation discloses alternative patterns for exchange of synchronization data and/or metadata, e.g., 'knowledge', to enhance performance of the synchronization processes. Particular aspects disclose various valid orders of operation for exchange of the data and/or metadata within each pattern. In particular, 'actual' (or 'stand-in') knowledge can be provided to facilitate sophisticated synchronization processes. Moreover, the innovation can learn from knowledge provided to further enhance synchronization processes.

In yet another aspect thereof, machine learning and reasoning components are provided that employ a probabilistic and/or statistical-based analysis to prognose or infer an action that a user desires to be automatically performed.

To the accomplishment of the foregoing and related ends, certain illustrative aspects of the innovation are described herein in connection with the following description and the annexed drawings. These aspects are indicative, however, of but a few of the various ways in which the principles of the innovation can be employed and the subject innovation is intended to include all such aspects and their equivalents. Other advantages and novel features of the innovation will become apparent from the following detailed description of the innovation when considered in conjunction with the drawings.

DETAILED DESCRIPTION

Figure 1:
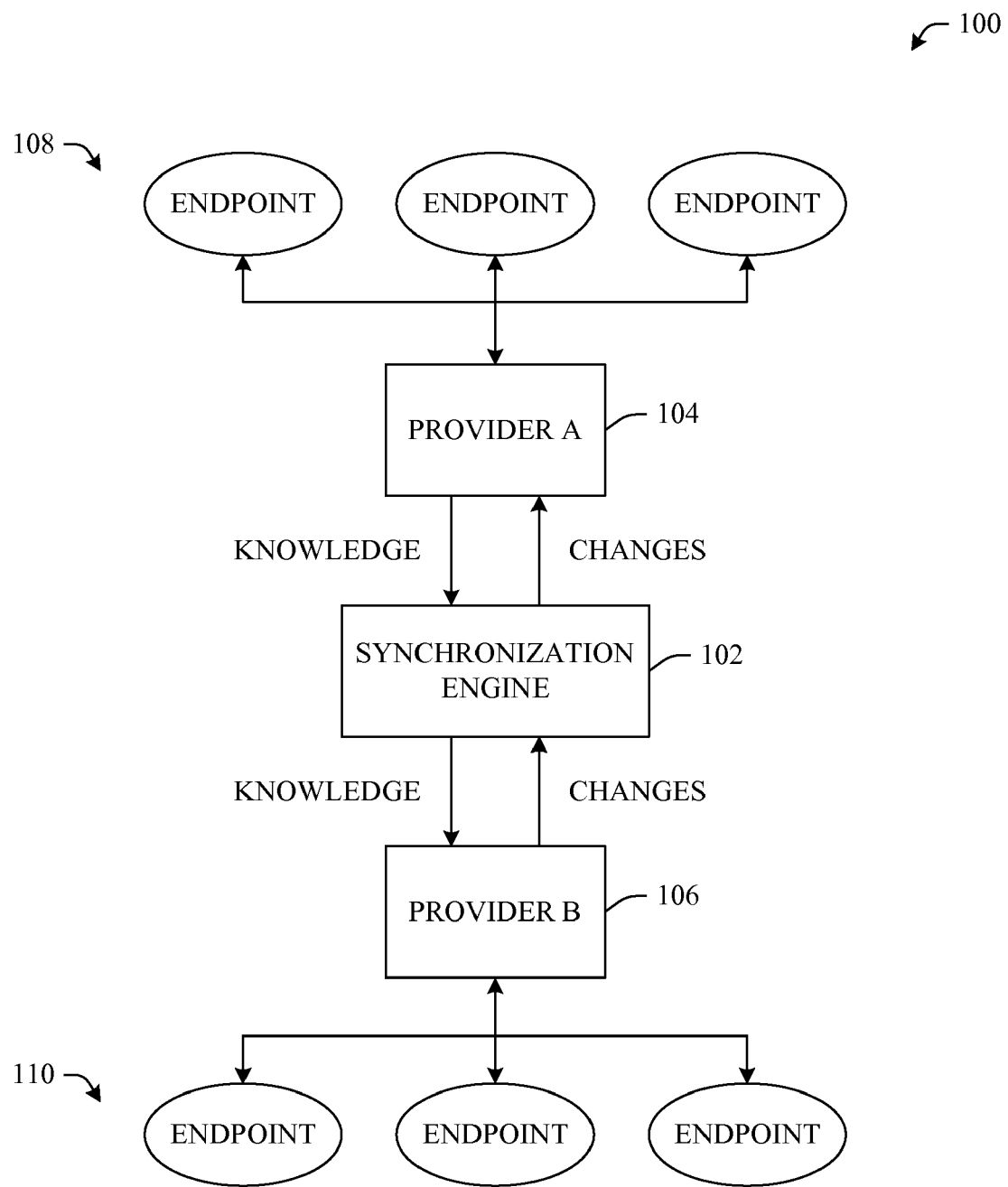
FIG. 1 illustrates a system that facilitates data synchronization in accordance with an aspect of the innovation.

The innovation is now described with reference to the drawings, wherein like reference numerals are used to refer to like elements throughout. In the following description, for purposes of explanation, numerous specific details are set forth in order to provide a thorough understanding of the subject innovation. It may be evident, however, that the innovation can be practiced without these specific details. In other instances, well-known structures and devices are shown in block diagram form in order to facilitate describing the innovation.

As used in this application, the terms "component" and "system" are intended to refer to a computer-related entity, either hardware, a combination of hardware and software, software, or software in execution. For example, a component can be, but is not limited to being, a process running on a processor, a processor, an object, an executable, a thread of execution, a program, and/or a computer. By way of illustration, both an application running on a server and the server can be a component. One or more components can reside within a process and/or thread of execution, and a component can be localized on one computer and/or distributed between two or more computers.

As used herein, the term to "infer" or "inference" refer generally to the process of reasoning about or inferring states of the system, environment, and/or user from a set of observations as captured via events and/or data. Inference can be employed to identify a specific context or action, or can generate a probability distribution over states, for example. The inference can be probabilistic that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

Referring initially to the drawings, FIG. 1 illustrates a system 100 that facilitates data synchronization between providers. As illustrated, system 100 can include a synchronization engine 102 that manages synchronization activities between two providers (104, 106). It is to be understood that, although the system illustrated in FIG. 1 is directed to a two-provider synchronization system it is to be understood that other aspects of the innovation can include additional providers without departing from the scope of the innovation.

In a standard synchronization system (e.g., 100), there exist three players in a synchronization session: the sync engine 102 and two synchronization providers 104, 106. The synchronization engine 102 is responsible for coordination of the synchronization session. The providers 104, 106 are responsible for interfacing with the endpoints 108, 110 being synchronized. As shown, each provider 104, 106 corresponds to some endpoint or class of endpoints (108, 110). It is to be understood that the plurality of endpoints (108, 110) variously being synchronized together in some synchronization topology as are sometimes referred to as 'partners.'

Conventionally, by necessity, the synchronization engine 102 and the providers 104, 106 must be running in the same process on the same computer, in multiple communicating processes on one computer, or in multiple communicating processes distributed across one-or-more computers. The following case of a one-way synchronization session is provided to add perspective to the innovation. Accordingly, this example is not intended to limit the scope of this disclosure in any way.

In a one-way synchronization session, in accordance with the subject innovation there would be a destination and a source (e.g., 104 or 106). In accordance with the innovation, regardless of the process configuration, the destination provider can make its 'knowledge' available to the source provider. The concept of 'knowledge' will be described in greater detail below—in summary, 'knowledge' can refer to status that the destination 'knows' at any particular instant in time.

Accordingly, the source provider conveys to the destination provider those changes that the destination provider does not yet 'know,' according to its provided knowledge. In one aspect, included within those changes can be the 'knowledge' the destination provider will 'learn' as it applies those changes; the so-called 'learned knowledge.' The figures that follow outline various embodiments related to the pattern for conveyance of knowledge and changes between various synchronization providers. More particularly, the figures that follow address at least the following seven scenarios:

1. One-Way Synchronization;
2. Two-Way, Non-Interleaved Synchronization;
3. Two-Way, Interleaved Synchronization;
4. Multi-Way Interleaved Synchronization;
5. Continuous Update Synchronization;
6. Ping-to-Pull Synchronization; and
7. Synchronization-Through-Intermediary.

As mentioned above, in each case, to accomplish efficient synchronization, the destination provider makes its knowledge available to the source provider. Then, the source provider conveys to the destination provider those changes that the destination provider does not yet 'know,' according to its knowledge. In aspects, included with those changes is the 'knowledge' the destination provider will 'learn' as it applies those changes; the so-called 'learned knowledge.'

Figure 2:
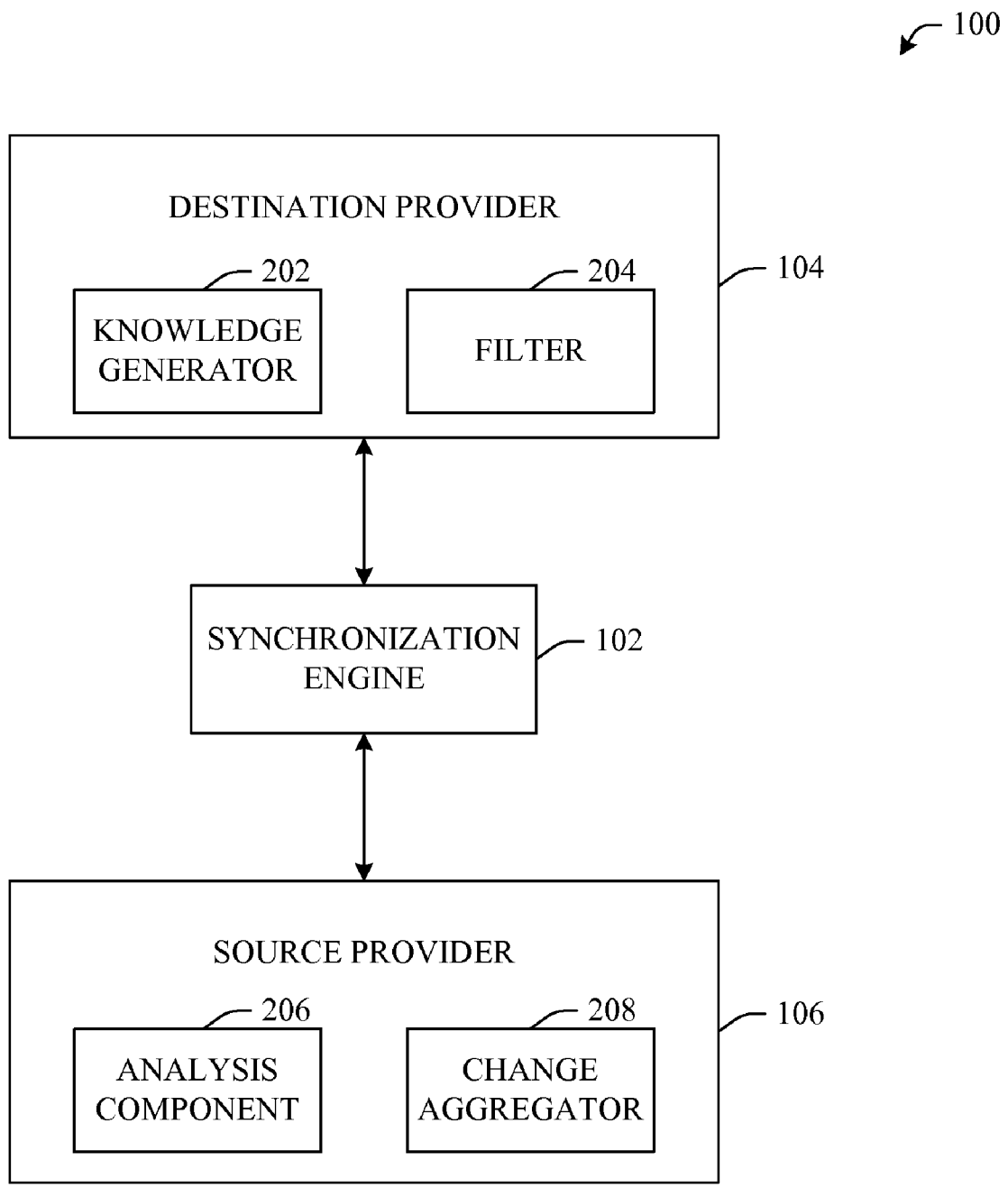
FIG. 2 illustrates a system that employs 'knowledge' to enhance synchronization processes in accordance with an aspect of the innovation.

FIG. 2 illustrates an alternative block diagram of system 100 in accordance with an aspect of the innovation. Essentially, system 100 illustrated in FIG. 2 shows subcomponents within each of the destination and source provider components (104, 106) respectively. Although providers are designated as shown in FIG. 2, it is to be understood that each provider can function as a source and/or a destination depending on a particular synchronization application. Thus, the subcomponents (or subset thereof) can be included within either or both of the providers in alternative aspects. Similarly, as will be described below, the innovation can be employed in aspects involving more than just two providers. These and other conceivable aspects are to be included within the scope of this innovation and claims appended hereto.

As shown, destination provider 104 can include a knowledge generator 202 and a filter 204. In operation, the knowledge generator 202 can establish 'knowledge' which sets forth the status of data within the destination provider 104 (or serviced endpoints). This knowledge is instrumental in informing the source provider based upon state or status of data maintained or managed by the destination provider 104. This knowledge can be transmitted to the source provider 106 by way of the synchronization engine 102.

Accordingly, the source provider 106 can include an analysis component 206 and a change aggregator 208 which together determine and compile data in accordance with the received knowledge. Essentially, this analysis of received knowledge provides sophisticated logic to limit or reduce transmission of redundant (or unnecessary) information. In other words, the analysis of the knowledge enables decisions to be made prior to sending changes to the destination from the source provider.

Similarly, the filter 204 can be employed to further filter any unnecessary changes prior to replacing date (or synchronizing) data within the store. The usefulness of the filtering functionality will become more apparent upon a review of the individual cases that follow. More specifically, in one aspect, where 'stand-in knowledge' is provided in lieu of actual knowledge, the filter can provide the necessary logic to further preclude unnecessary or redundant synchronization within the destination provider (or supported endpoints).

As will be shown in connection with the discussion that follows, it is also worth considering that the source provider 106 need not have the knowledge from the destination. Here, the filter component 204 can be employed to limit the set. Here, the destination knowledge is used to filter the set of changes the destination does not know from the set of changes known to the source. Accordingly, the source could forward all changes to the destination, thus removing the need for the source to know the destination's actual knowledge. However, this requires the destination to filter changes from the source against its own knowledge to remove those that are obsolete (or not needed).

In an alternative aspect, the destination can fabricate some 'stand-in' knowledge (perhaps simpler to represent), such that all changes unknown to the actual knowledge are unknown to the 'stand-in' knowledge, in which case this information could be sent to the destination in place of the true destination knowledge. It is to be understood that this scenario can be accomplished to reduce data transmission over the wire (in terms of the knowledge transfer) or to simplify processing at the source. Note that if one considers that the source not knowing the destination knowledge is equivalent to the 'stand-in' knowledge, then it is clear that the source not knowing the destination knowledge is simply a special case of the stand-in knowledge variation.

Figure 3:
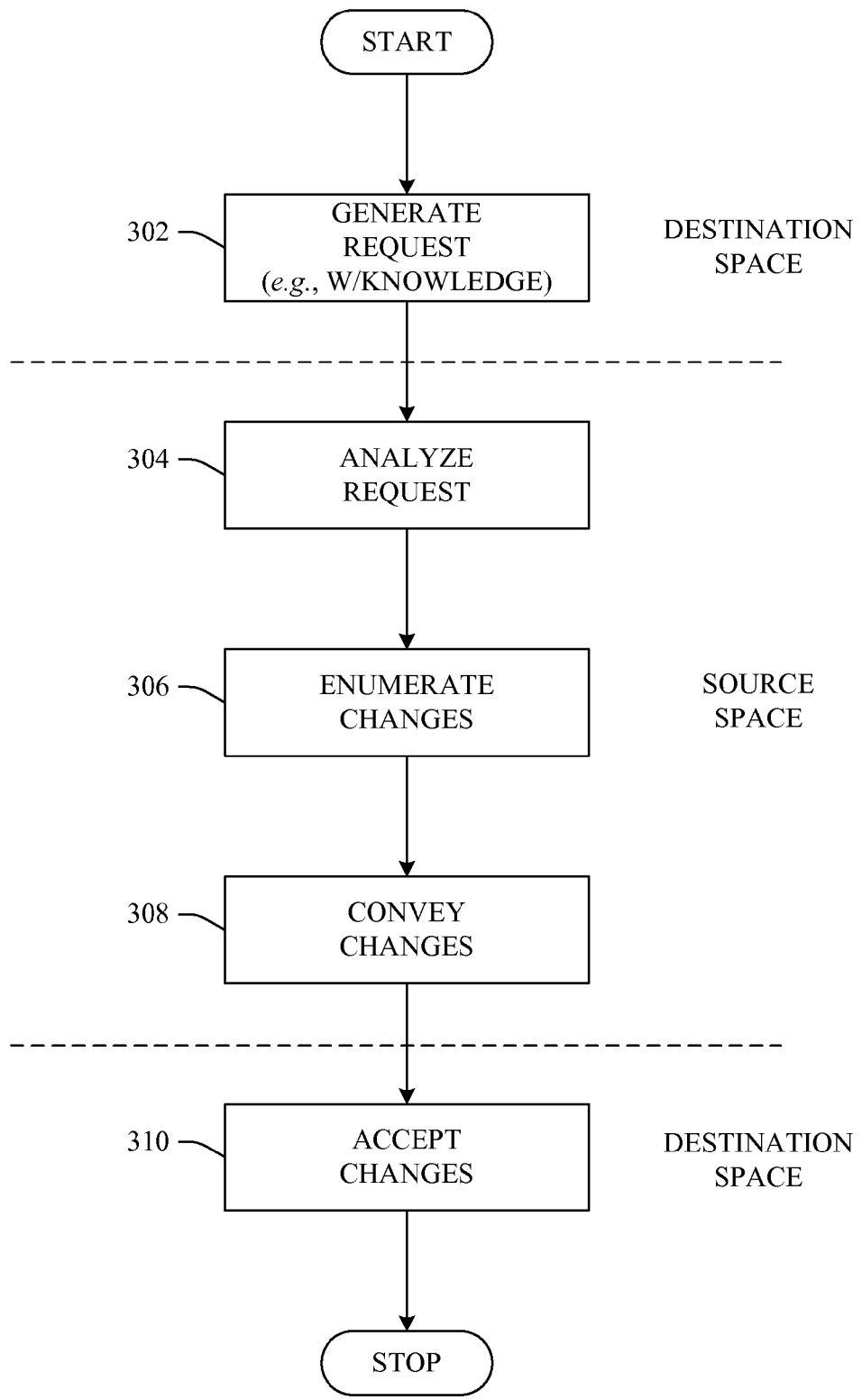
FIG. 3 illustrates an example flow chart of procedures that facilitate one-way knowledge-based synchronization in accordance with an aspect of the innovation.
Figure 5:
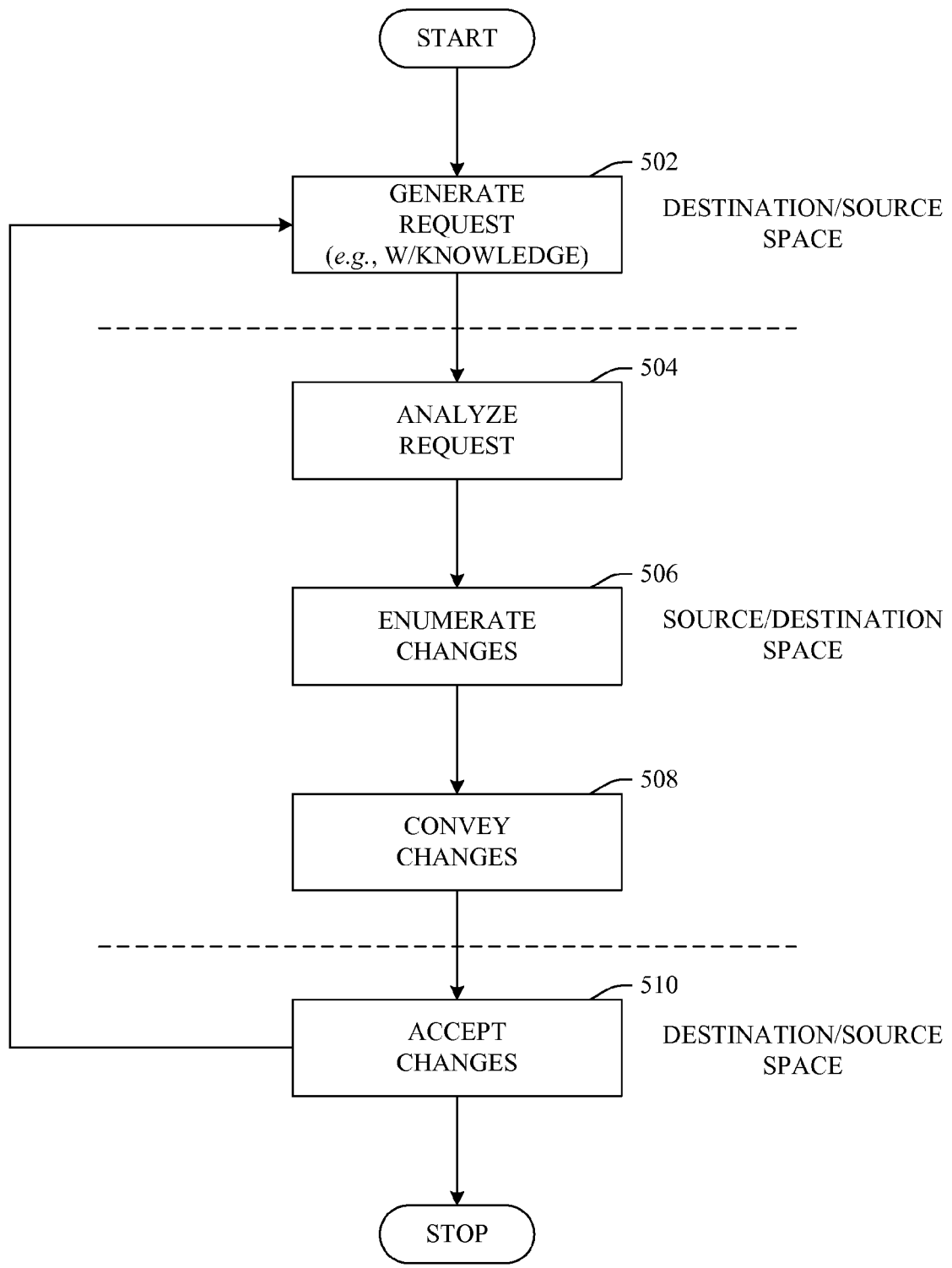
FIG. 5 illustrates an example flow chart of procedures that facilitate non-interleaved knowledge-based two-way synchronization in accordance with an aspect of the innovation.
Figure 6:
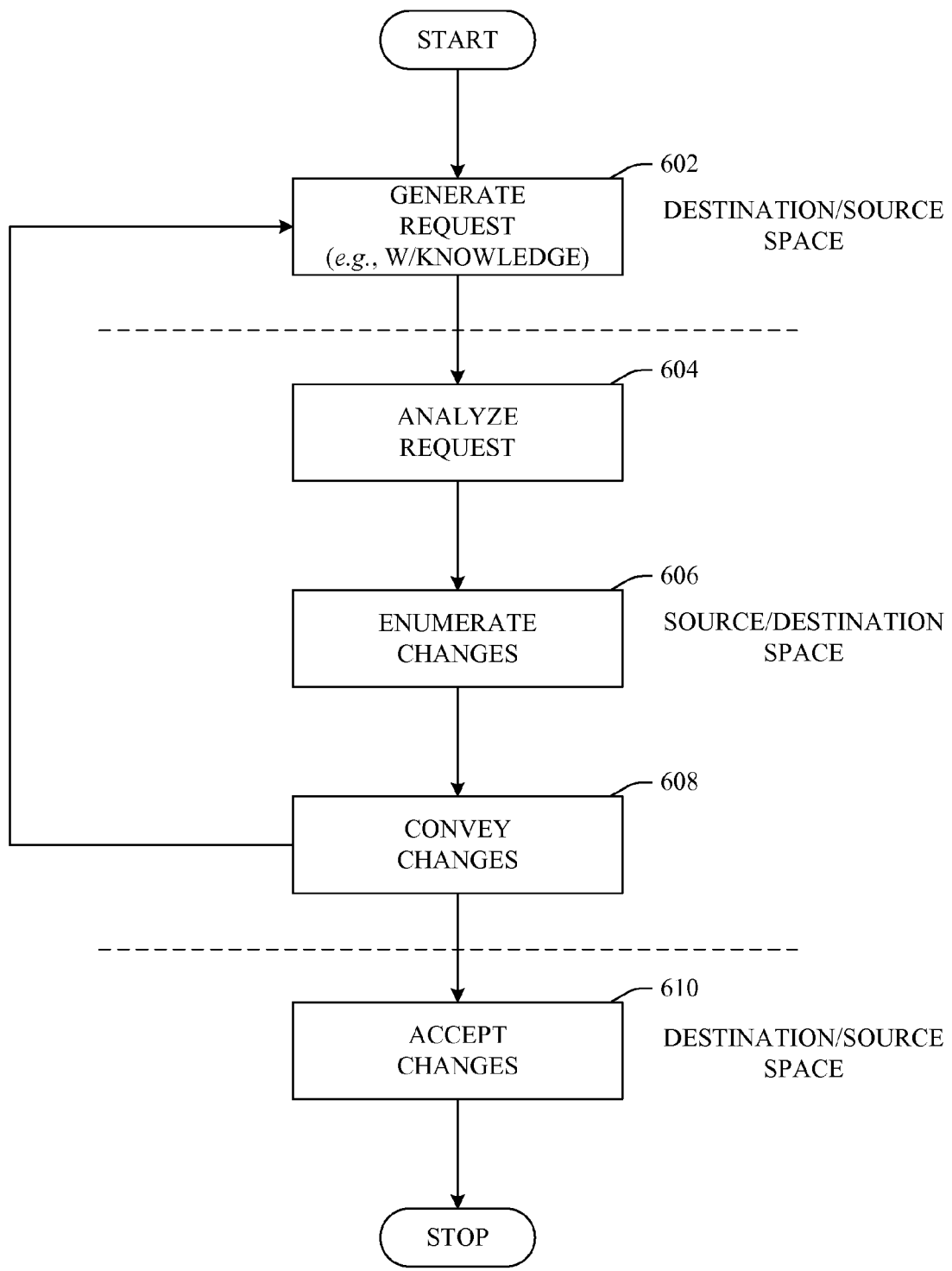
FIG. 6 illustrates an example flow chart of procedures that facilitate interleaved knowledge-based two-way synchronization in accordance with an aspect of the innovation.
Figure 7:
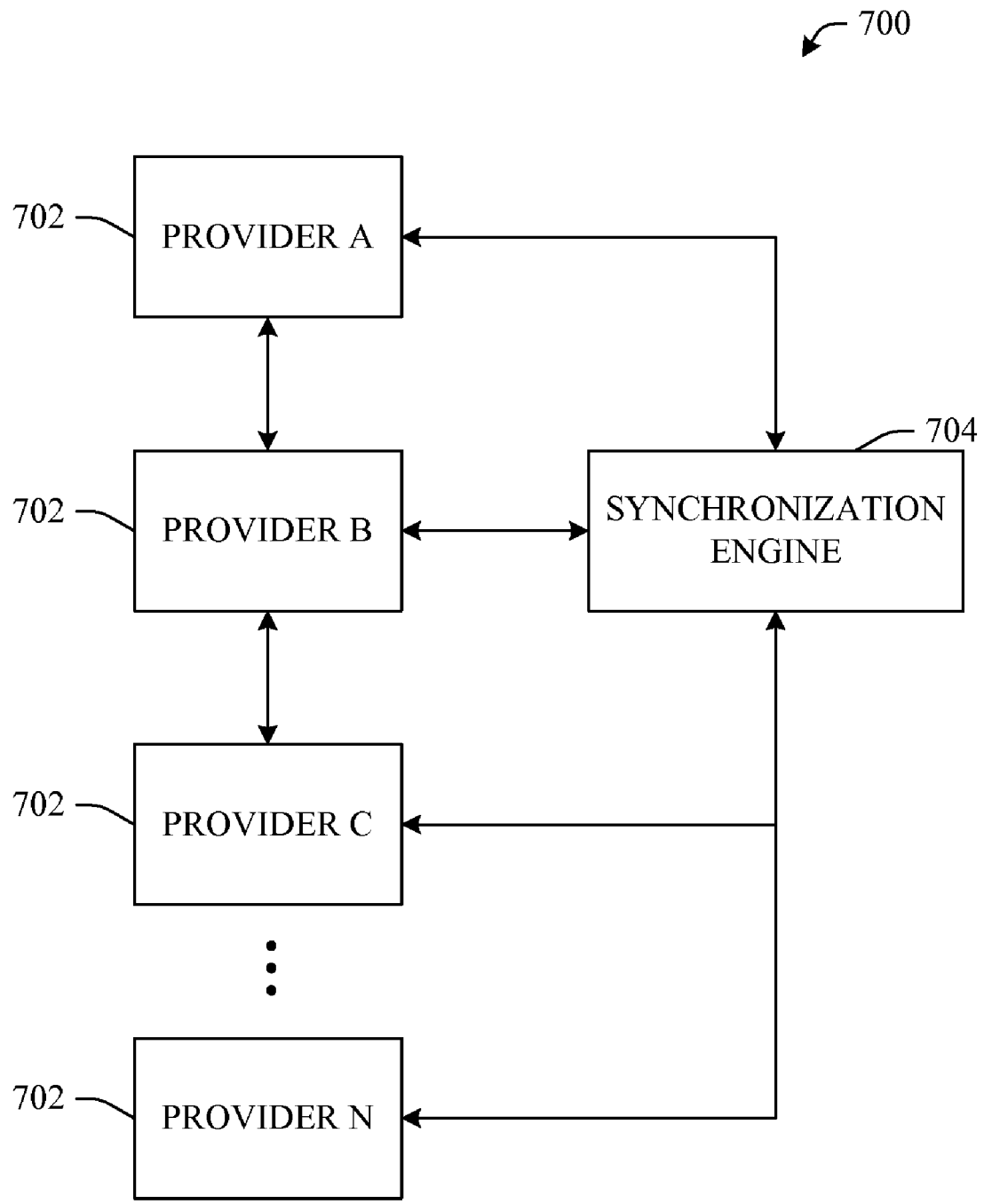
FIG. 7 illustrates an example block diagram of a system that facilitates knowledge-based multi-way interleaved synchronization in accordance with an aspect of the innovation.
Figure 8:
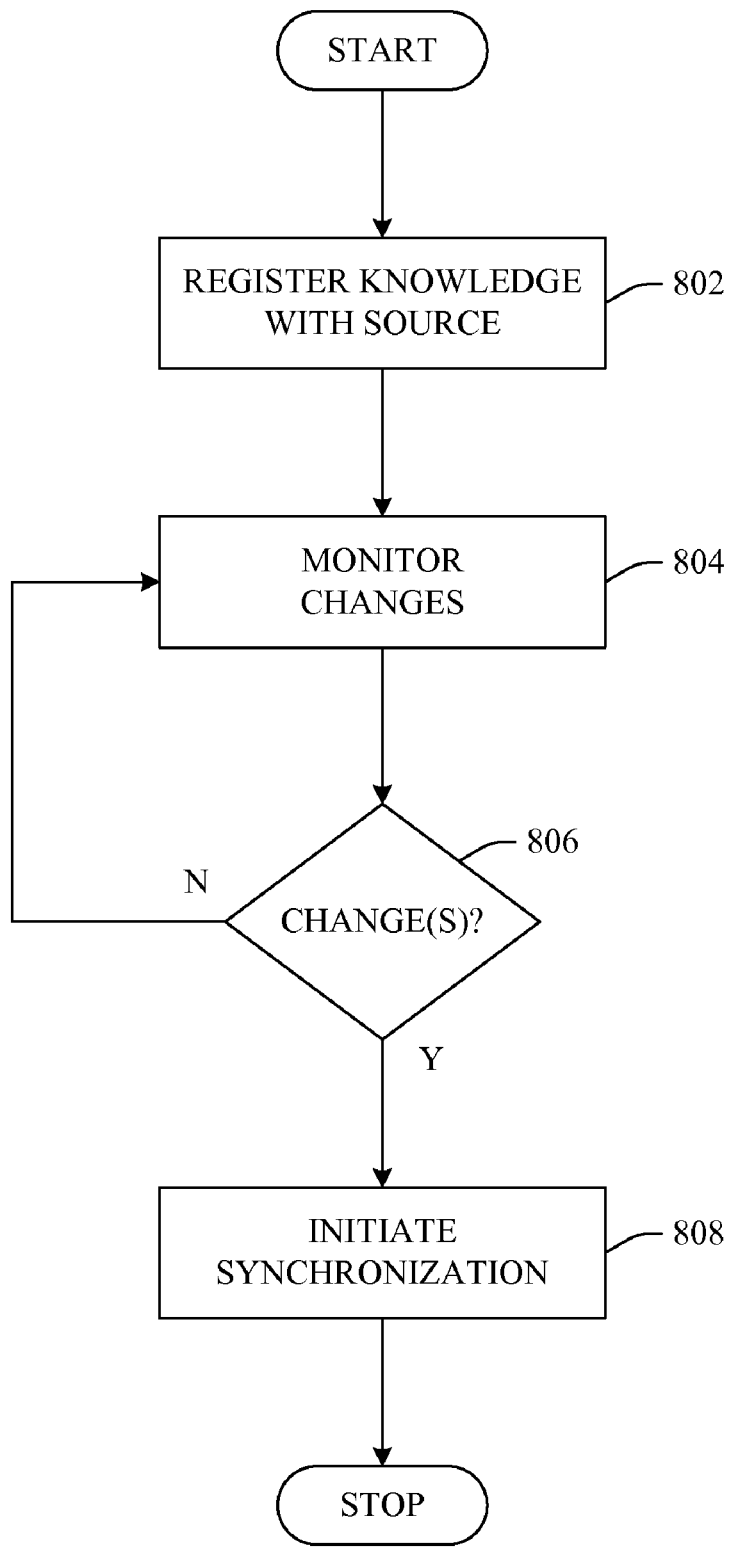
FIG. 8 illustrates an example flow chart of procedures that facilitate monitoring a source for continuous updates in accordance with an aspect of the innovation.

The following discussion enumerates various solutions to the issues associated with conventional synchronization implementation. More particularly, the innovation addresses many of the issues associated with synchronization and specifically is directed to patterns for conveyance of knowledge and changes between various synchronization providers. The figures and discussion that follows considers patterns referred to as:

One-Way Synchronization (FIG. 3);
Two-Way, Non-Interleaved Synchronization (FIG. 5);
Two-Way, Interleaved Synchronization (FIG. 6);
Multi-Way Interleaved Synchronization (FIG. 7);
Continuous Updates (FIG. 8);
Ping-to-Pull (FIG. 9); and
Sync-through-Intermediary (FIG. 10).

FIG. 3 illustrates an example methodology of one-way synchronization in accordance with an aspect of the innovation. In other words, FIG. 3 illustrates example acts involved in synchronizing a single destination with a single source in accordance with an aspect of the innovation. While FIG. 3 addresses one-way synchronization with a single source, it is to be understood that the methodology can be employed to synchronize a destination with multiple sources without departing from the spirit and/or scope of the innovation.

While, for purposes of simplicity of explanation, the one or more methodologies shown herein, e.g., in the form of a flow chart, are shown and described as a series of acts, it is to be understood and appreciated that the subject innovation is not limited by the order of acts, as some acts may, in accordance with the innovation, occur in a different order and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the innovation.

One-way synchronization can be considered one of the simplest patterns of synchronizing data between providers (or end points). Consider that provider A (e.g., 104 of FIG. 1) wishes to synchronize with provider B (e.g., 106 of FIG. 1). As illustrated in FIG. 1, a synchronization engine 102 can be employed to manage the flow of control between the providers. For instance, each provider can expose the various primitives responses (e.g., getchanges) as well as primitives to accept the results of the various primitives (e.g., process-changes). In such a case the synchronization engine 102 would drive the synchronization operation while stateless providers (104, 106) simply respond to various method calls.

Referring again to FIG. 3, at 302, a first provider (e.g., provider A) can generate a request for changes from a second provider (e.g., provider B). Effectively, provider A requests changes from provider B. As shown, provider A typically sends its 'knowledge' to provider B as a part of this request. However, the variations for sending destination knowledge mentioned previously are also valid within this methodology, for example 'stand-in' knowledge. In other aspects, provider A may also send various request metadata such as a batch size, e.g., where synchronization is divided into multiple change batches. Additionally, provider A may send a scope identifier (id) in the case provider B offers multiple scopes to synchronize (e.g., conceptually multiple endpoints).

At 304, the request is analyzed and changes enumerated at 306. In this example, provider B computes the set of changes not known to provider A (including versions). Provider B includes the learned knowledge for each change in the batch. Moreover, provider B may also include additional metadata such as a scope id, the size of the return batch, etc.

At 308, the changes can be conveyed from the source to the destination. For instance and continuing with the aforementioned example, provider B transmits the set of changes to provider A. In this act, the changes can include the identifier of the changed item(s), the item's creation version(s), the item's update version(s), a flag that denotes whether or not the item(s) was deleted, etc. Essentially, identifying criteria can be most any identifying criteria that classify changes, modifications, additions, deletions, etc. to/of an item or group of items. In the case of an item with change units, the update version can be a per change unit, thus, there can be an id per change unit. Note that provider B may choose to supply changes individually or in ranges as desired or appropriate. Provider B may or may not include the changed data in the change batch. Additionally, if data is supplied, provider B may supply all of the data for the item, or only a change-delta without departing from the scope of the innovation.

At 310, the changes are accepted. In the example set forth above, provider A can take the changes received from provider B and apply them as set forth in FIG. 4 that follows. It is to be understood that the example methodologies provided herein are included to add perspective to the innovation and are not intended to limit the innovation in any way. Rather, it is to be appreciated that other examples exist that are to be included within the scope of the innovation and claims appended hereto.

Figure 4:
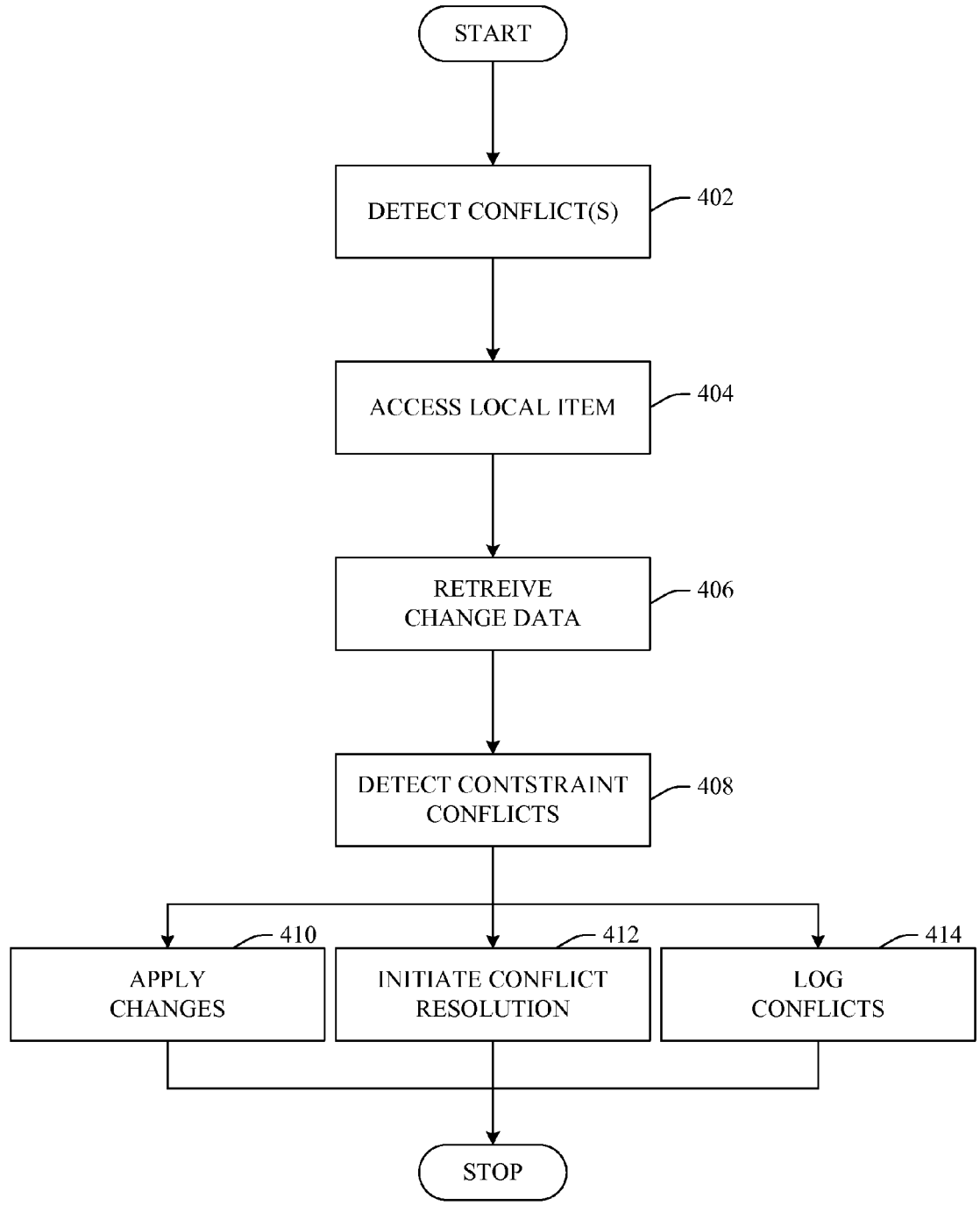
FIG. 4 illustrates an example flow chart of procedures that facilitate accepting changes in accordance with an aspect of the innovation.

Turning now to FIG. 4, an example methodology of accepting changes is shown in accordance with an aspect of the innovation. Essentially, methodology 310 illustrates the processing actions performed by provider A in accordance with the changes received from provider B. It is to be understood that these actions can be performed in most any order. As well, it is to be understood that the processing methodology of FIG. 4 is illustrative of an example scenario and is not intended to limit the scope of the innovation in any way.

Upon accepting changes, at 402, conflicts are detected. Here, conflicts are detected (using supplied knowledge) as well as mechanisms to resolve detected conflicts are chosen. It is to be understood that most any conflict resolution mechanisms known in the art can be employed without departing from the spirit and scope of the innovation described herein. In aspects, the conflict resolution mechanisms can be automatic and/or manual as desired or appropriate.

Still further, it is to be understood that the subject innovation can manage "constraint" conflicts that are not detectable in knowledge (e.g., they do not result from concurrent changes) but rather exist because a change that originated remotely cannot be applied locally, typically due to violation of some business or processing rule. For example, if the destination is a file system it may not allow multiple files with the same name. Or, if the destination is a database, it may have one or more constraints on the table rows, for example a range check or other consistency check. These are conflicts, but they are not detectable from knowledge.

For each change, a corresponding local item is located at 404. Here, the item that corresponds to the source provided local item is located within the destination provider. It is to be understood that the methodology of FIG. 4 can be recursive for each item identified by the source as an issue item.

At 406, the change data (if not included in the batch supplied by the source) is retrieved for cases where there is a conflict or the remote version is a winner of the conflict. Further, at 408, any constraint conflicts (e.g., not using knowledge) are detected. Additionally, mechanisms as to how to resolve them is also chosen at 408.

As illustrated by 410, 412 and 414 respectively, either the change is applied, a conflict resolution to the local item is initiated, and/or the conflict is logged. In all cases, the knowledge can be simultaneously updated as required or appropriate. For example, the learned knowledge can be added for the change to the local knowledge. In aspects, adding the learned knowledge can be bypassed in cases wherein the conflict is logged. It will be understood that the methodology of FIGS. 3 and 4 provides a framework for two-way synchronization (FIG. 5) as well as a basis for describing the other patterns that follow (FIGS. 6 to 10).

Referring now to FIG. 5, an example methodology of a non-interleaved two-way synchronization is shown. Essentially, the methodology is a recursive version of the one-way synchronization. The methodology illustrated in FIG. 5 is often considered the most straightforward form of two-way synchronization. In this method, provider A performs a one-way synchronization from provider B as shown in acts 502, 504, 506, 508 and 510. It is to be understood that these acts are the same as illustrated in FIG. 3, acts 302-310.

Following a first pass (or one-way synchronization), the two providers switch places and provider B completes a two-way synchronization from provider A. This switch is illustrated by the arrow from 510 to 502 as shown in FIG. 5. Note that, in the case where conflicts are detected and resolved, multiple two-way synchronization operations may be required to reach convergence, especially if there are constraint conflicts possible on either endpoint or changes are made to either endpoint during the synchronization operation. This recursive functionality is again illustrated by the arrow from act 510 to act 502.

An example methodology of an interleaved synchronization in accordance with an aspect of the innovation is shown. As illustrated, the methodology of FIG. 6 is a variation of the aforementioned two-way synchronization. In this method, the sending provider can begin a receive synchronization from the destination provider, once it has conveyed the made with knowledge with its send batch (e.g., acts 602-608), but, prior to accepting the changes (e.g., at 610). This initiation of the synchronization from the destination provider is illustrated by the arrow from act 608 to 602. Since the destination provider has the source provider's knowledge available, it can determine changes on the destination not known to the source and can send them back to the source. This allows the source and destination to variously interleave the exchange of batches during two-way synchronization.

FIG. 7 illustrates a system 700 that enables multi-way interleaved synchronization in accordance with aspects of the innovation. Essentially, the system 700 facilitates a method which is a variation of two-way interleaved synchronization (FIG. 6) but for multiple partners (702). In particular, consider where provider A is sending changes to provider B. Now consider some third (or fourth, fifth, . . . ) provider, provider C (D, E, . . . N).

Here, provider C can begin to receive changes from provider B (e.g., via synchronization engine 704); provider B can send all changes from endpoint B not known to provider C and, in addition, forward those changes from provide A that are also unknown to provider C. It is to be understood that the flow of data can be accomplished via the synchronization engine 704. Note provider B, could choose to only send changes to C after conflicts are detected and possibly resolved (minimizing the chance of conflict resolutions). Additionally, provider B could simply 'pass-through' changes to provider C, e.g., favoring throughput. It is worthwhile considering that this method could extend to more providers, with provider N receiving from provider C as C does from B, and so on, where N is an integer.

FIG. 8 illustrates an example continuous updates methodology in accordance with an aspect of innovation. In this method there is no defined 'synchronization session,' rather, the session is simply on-going. In particular, assume provider A would like to receive changes from provider B. In such a case, at 802, provider A registers its current knowledge with provider B. Accordingly, at 804, provider B can monitor changes. For example, provider B can check periodically (on each change or one some defined or inferred timer/schedule) to see if there are changes unknown to provider A.

Here, a decision can be made at 806 to determine if changes are found. If not, the method returns to 804 to monitor for changes. However, if changes are located, synchronization can be initiated at 808. In other words, in such a case, provider B can contact provider A and initiate synchronization as in one-way synchronization shown in FIG. 3. Note that in such a case provider B could contact provider A and provider A could respond with its current local knowledge which may be newer than that registered with provider B and could minimize the sending of obsolete changes. Alternatively, provider B could simply reply with changes based on the registered knowledge, e.g., possibly leading to the transmission of obsolete changes, but potentially saving a round-trip. Thus, expense and efficiency can be reduced and increased respectively.

Note that in the implementation described with reference to FIG. 8, provider A could publish its knowledge to provider B and then block for some remote-procedure call to return with a change batch when changes eventually become available. Alternatively, provider A could publish its knowledge to provider B, sever the connection, and provider B could build-up a new connection and call-back at some future point.

One may also consider variations where provider A periodically registers updated knowledge with provider B outside of their synchronizations. This may be useful where A is also synchronizing with partners other than B, as it can minimize the sending of obsolete changes. Provider B could return changes as soon as they are available, or it could configurably be set to wait for some period from first change detection to allow a batch of changes to accumulate. Alternately, provider B could wait until some number of changes is available before sending to provider A, but this could lead to staleness at provider A. Nonetheless, it will be understood that this could be useful in some scenarios. Although these alternative aspects are not illustrated in FIG. 8, it is to be understood that they are to be included within the scope of this disclosure and claims appended hereto.

Figure 9:
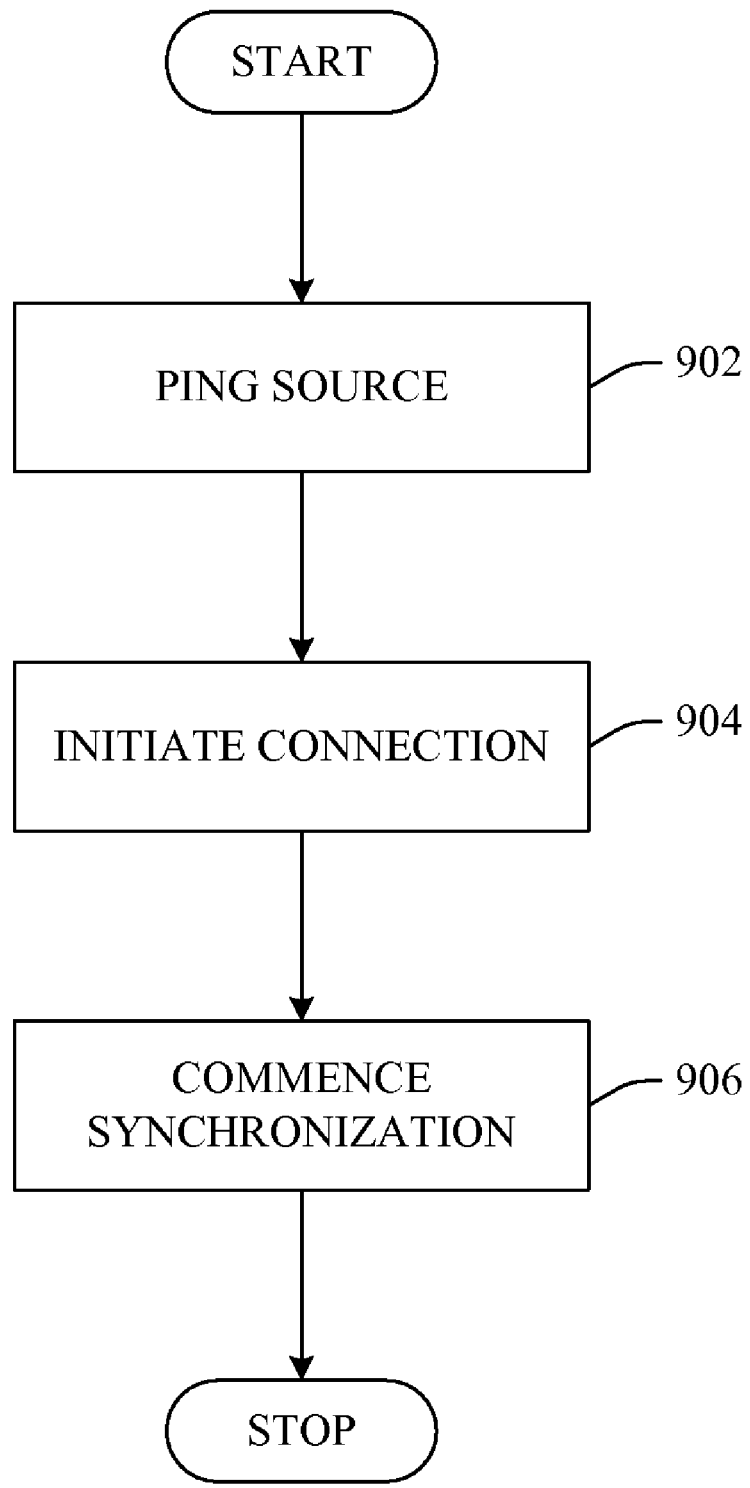
FIG. 9 illustrates an example flow chart of procedures that facilitate a 'Ping-to-Pull' mechanism in accordance with an aspect of the innovation.
Figure 10:
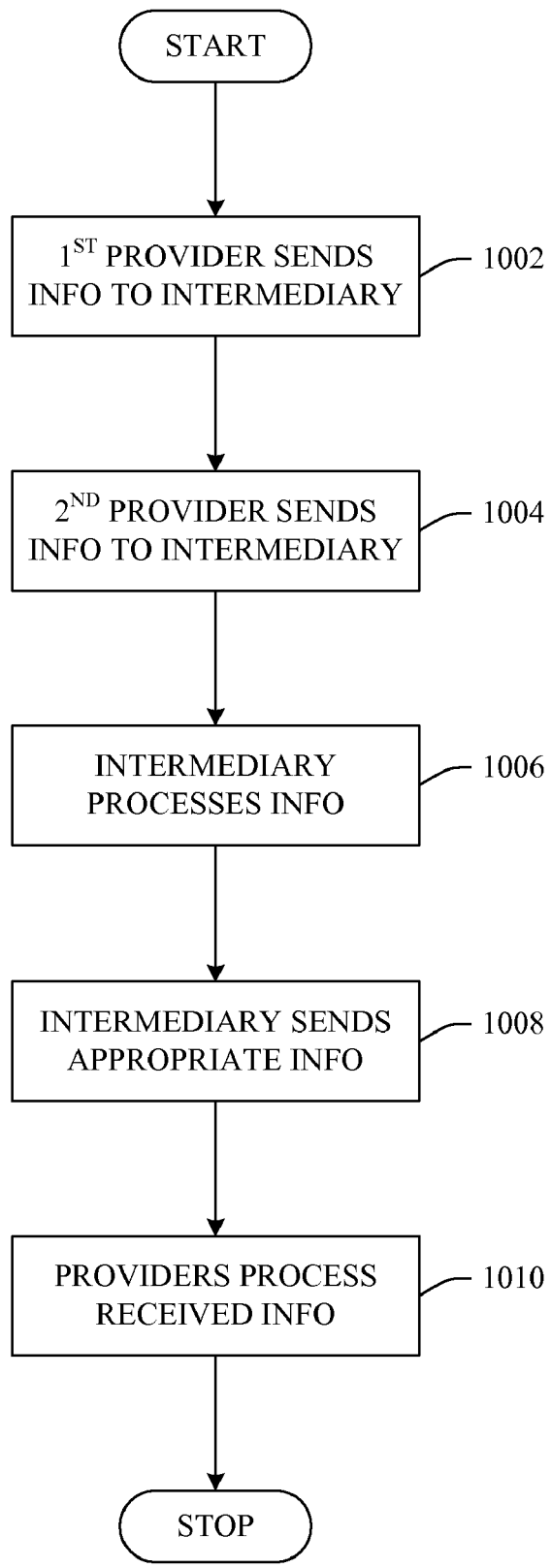
FIG. 10 illustrates an example flow chart of procedures that facilitate knowledge-based synchronization through an intermediary in accordance with an aspect of the innovation.

Turning now to FIG. 9, an example methodology that facilitates 'Ping-to-Pull' changes in accordance with an aspect is shown. In this variation, provider A could synchronize with provider B but provider A does not or cannot initiate a data connection. Rather, provider A only has the capability to send a 'ping' to provider B. Thus, at 902, provider A sends a ping to provider B and provider B responds, at 904, by initiating a connection to A. Provider A then, at 906, commences synchronization by using this connection to transmit knowledge and one of the aforementioned synchronization patterns is run.

If A is capable of putting some small data into the payload, then A could include its knowledge, or some 'stand-in' knowledge if space is limited. In such a case, a roundtrip is saved. Additionally, if B can determine from the included knowledge that there are no changes to transmit to A, then B could decline to reply to A's request or it could send some simplified 'nothing to send' type of response.

Referring now to FIG. 10, an alternative block diagram of an example methodology of synchronizing through an intermediary in accordance with an aspect of the innovation is shown. In this variation provider A and provider B are unable (or unwilling) to connect, except via from intermediary M. It is to be understood that M may be a 'dumb' data store or some more general purpose data store. In this case, the innovation allows for A and B to synchronize via M.

In a straightforward variation, providers A and B, variously place messages for each other on M and poll M for messages, effectively using M as a store-and-forward relay. In more complicated variations, provider B may publish changes, including learned knowledge, to M. Provider A can then inspect these changes, do obsolete change detection, and then apply locally those changes that are not obsolete. Similarly, Provider A may also publish changes to M for B. Additionally, it is to be understood that the model scales to other parties also publishing and receiving changes to the store, without modification.

As illustrated in FIG. 10, at 1002, a first provider can send information (including knowledge) to the intermediary. Similarly, at 1004, a second provider can send information to the intermediary. The intermediary can process the information at 1006 and send appropriate information to providers A and/or B at 1008. At 1010, the providers A and/or B process received information and accept changes as appropriate.

In yet other aspects, the innovation can employ machine learning and reasoning (MLR) components which facilitate automating one or more features in accordance with the innovation. The subject innovation (e.g., in connection with accepting/processing changed data) can employ various MLR-based schemes for carrying out various aspects thereof. For example, a process for determining when to accept and/or process changes can be facilitated via an automatic classifier system and process.

A classifier is a function that maps an input attribute vector, $x=(x1, x2, x3, x4, xn)$, to a confidence that the input belongs to a class, that is, $f(x)=confidence(class)$. Such classification can employ a probabilistic and/or statistical-based analysis (e.g., factoring into the analysis utilities and costs) to prognose or infer an action that a user desires to be automatically performed.

A support vector machine (SVM) is an example of a classifier that can be employed. The SVM operates by finding a hypersurface in the space of possible inputs, which the hypersurface attempts to split the triggering criteria from the non-triggering events. Intuitively, this makes the classification correct for testing data that is near, but not identical to training data. Other directed and undirected model classification approaches include, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

As will be readily appreciated from the subject specification, the subject innovation can employ classifiers that are explicitly trained (e.g., via a generic training data) as well as implicitly trained (e.g., via observing user behavior, receiving extrinsic information). For example, SVM's are configured via a learning or training phase within a classifier constructor and feature selection module. Thus, the classifier(s) can be used to automatically learn and perform a number of functions, including but not limited to determining according to a predetermined criteria when to accept and/or process changes, when to ping a source for changes, when to notify a source of changes, etc.

Figure 11:
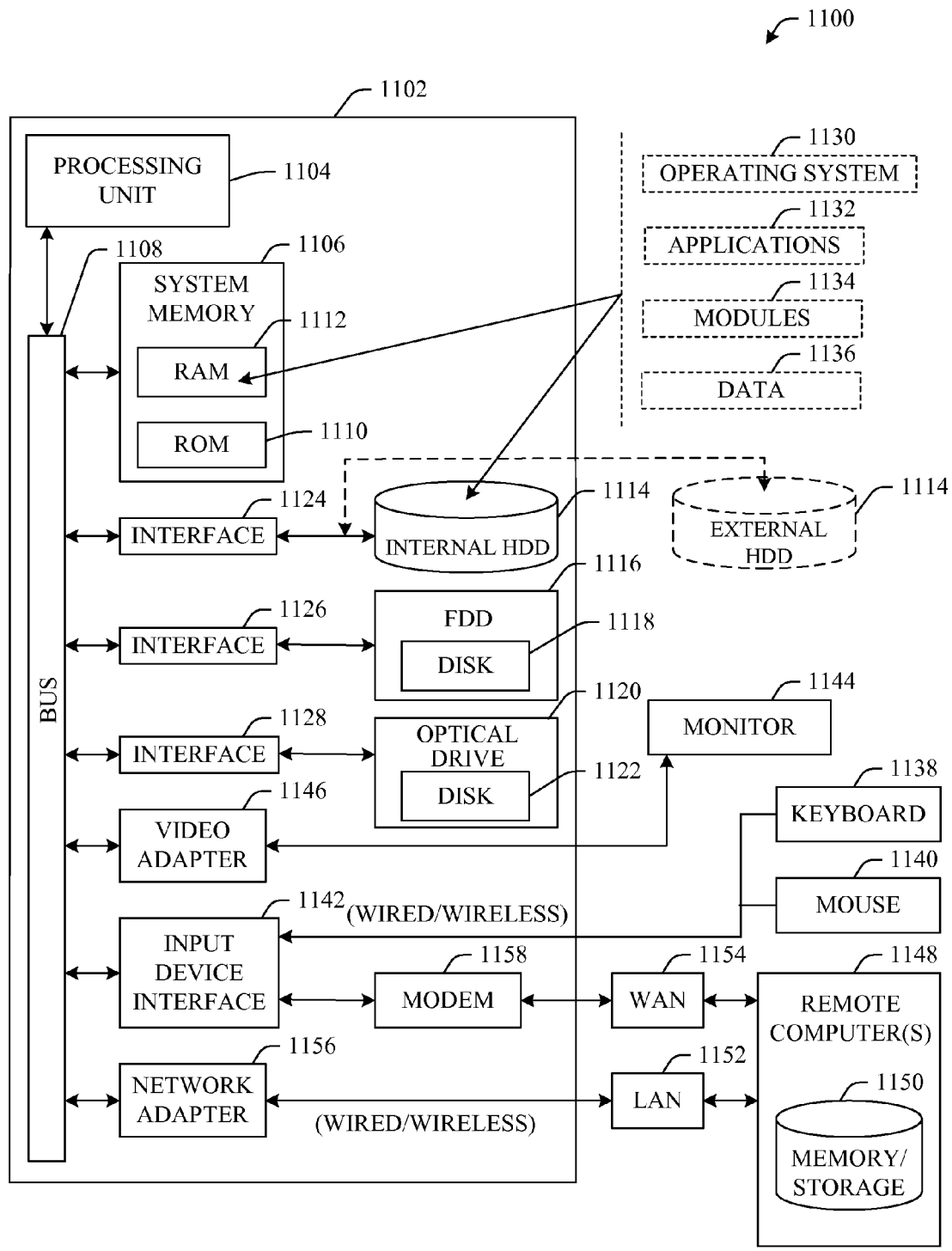
FIG. 11 illustrates a block diagram of a computer operable to execute the disclosed architecture.

Referring now to FIG. 11, there is illustrated a block diagram of a computer operable to execute the disclosed architecture. In order to provide additional context for various aspects of the subject innovation, FIG. 11 and the following discussion are intended to provide a brief, general description of a suitable computing environment 1100 in which the various aspects of the innovation can be implemented. While the innovation has been described above in the general context of computer-executable instructions that may run on one or more computers, those skilled in the art will recognize that the innovation also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the innovation may also be practiced in distributed computing environments where certain tasks are performed by remote processing devices that are linked through a communications network. In a distributed computing environment, program modules can be located in both local and remote memory storage devices.

A computer typically includes a variety of computer-readable media. Computer-readable media can be any available media that can be accessed by the computer and includes both volatile and nonvolatile media, removable and non-removable media. By way of example, and not limitation, computer-readable media can comprise computer storage media and communication media. Computer storage media includes both volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or any other medium which can be used to store the desired information and which can be accessed by the computer.

Communication media typically embodies computer-readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

With reference again to FIG. 11, the exemplary environment 1100 for implementing various aspects of the innovation includes a computer 1102, the computer 1102 including a processing unit 1104, a system memory 1106 and a system bus 1108. The system bus 1108 couples system components including, but not limited to, the system memory 1106 to the processing unit 1104. The processing unit 1104 can be any of various commercially available processors. Dual microprocessors and other multi-processor architectures may also be employed as the processing unit 1104.

The system bus 1108 can be any of several types of bus structure that may further interconnect to a memory bus (with or without a memory controller), a peripheral bus, and a local bus using any of a variety of commercially available bus architectures. The system memory 1106 includes read-only memory (ROM) 1110 and random access memory (RAM) 1112. A basic input/output system (BIOS) is stored in a nonvolatile memory 1110 such as ROM, EPROM, EEPROM, which BIOS contains the basic routines that help to transfer information between elements within the computer 1102, such as during start-up. The RAM 1112 can also include a high-speed RAM such as static RAM for caching data.

The computer 1102 further includes an internal hard disk drive (HDD) 1114 (e.g., EIDE, SATA), which internal hard disk drive 1114 may also be configured for external use in a suitable chassis (not shown), a magnetic floppy disk drive (FDD) 1116, (e.g., to read from or write to a removable diskette 1118) and an optical disk drive 1120, (e.g., reading a CD-ROM disk 1122 or, to read from or write to other high capacity optical media such as the DVD). The hard disk drive 1114, magnetic disk drive 1116 and optical disk drive 1120 can be connected to the system bus 1108 by a hard disk drive interface 1124, a magnetic disk drive interface 1126 and an optical drive interface 1128, respectively. The interface 1124 for external drive implementations includes at least one or both of Universal Serial Bus (USB) and IEEE 1394 interface technologies. Other external drive connection technologies are within contemplation of the subject innovation.

The drives and their associated computer-readable media provide nonvolatile storage of data, data structures, computer-executable instructions, and so forth. For the computer 1102, the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer, such as zip drives, magnetic cassettes, flash memory cards, cartridges, and the like, may also be used in the exemplary operating environment, and further, that any such media may contain computer-executable instructions for performing the methods of the innovation.

A number of program modules can be stored in the drives and RAM 1112, including an operating system 1130, one or more application programs 1132, other program modules 1134 and program data 1136. All or portions of the operating system, applications, modules, and/or data can also be cached in the RAM 1112. It is appreciated that the innovation can be implemented with various commercially available operating systems or combinations of operating systems.

A user can enter commands and information into the computer 1102 through one or more wired/wireless input devices, e.g., a keyboard 1138 and a pointing device, such as a mouse 1140. Other input devices (not shown) may include a microphone, an IR remote control, a joystick, a game pad, a stylus pen, touch screen, or the like. These and other input devices are often connected to the processing unit 1104 through an input device interface 1142 that is coupled to the system bus 1108, but can be connected by other interfaces, such as a parallel port, an IEEE 1394 serial port, a game port, a USB port, an IR interface, etc.

A monitor 1144 or other type of display device is also connected to the system bus 1108 via an interface, such as a video adapter 1146. In addition to the monitor 1144, a computer typically includes other peripheral output devices (not shown), such as speakers, printers, etc.

The computer 1102 may operate in a networked environment using logical connections via wired and/or wireless communications to one or more remote computers, such as a remote computer(s) 1148. The remote computer(s) 1148 can be a workstation, a server computer, a router, a personal computer, portable computer, microprocessor-based entertainment appliance, a peer device or other common network node, and typically includes many or all of the elements described relative to the computer 1102, although, for purposes of brevity, only a memory/storage device 1150 is illustrated. The logical connections depicted include wired/wireless connectivity to a local area network (LAN) 1152 and/or larger networks, e.g. a wide area network (WAN) 1154. Such LAN and WAN networking environments are commonplace in offices and companies, and facilitate enterprise-wide computer networks, such as intranets, all of which may connect to a global communications network, e.g., the Internet.

When used in a LAN networking environment, the computer 1102 is connected to the local network 1152 through a wired and/or wireless communication network interface or adapter 1156. The adapter 1156 may facilitate wired or wireless communication to the LAN 1152, which may also include a wireless access point disposed thereon for communicating with the wireless adapter 1156.

When used in a WAN networking environment, the computer 1102 can include a modem 1158, or is connected to a communications server on the WAN 1154, or has other means for establishing communications over the WAN 1154, such as by way of the Internet. The modem 1158, which can be internal or external and a wired or wireless device, is connected to the system bus 1108 via the serial port interface 1142. In a networked environment, program modules depicted relative to the computer 1102, or portions thereof, can be stored in the remote memory/storage device 1150. It will be appreciated that the network connections shown are exemplary and other means of establishing a communications link between the computers can be used.

The computer 1102 is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from a couch at home, a bed in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, etc.) to provide secure, reliable, fast wireless connectivity. A Wi-Fi network can be used to connect computers to each other, to the Internet, and to wired networks (which use IEEE 802.3 or Ethernet). Wi-Fi networks operate in the unlicensed 2.4 and 5 GHz radio bands, at an 11 Mbps (802.11a) or 54 Mbps (802.11b) data rate, for example, or with products that contain both bands (dual band), so the networks can provide real-world performance similar to the basic 10BaseT wired Ethernet networks used in many offices.

Figure 12:
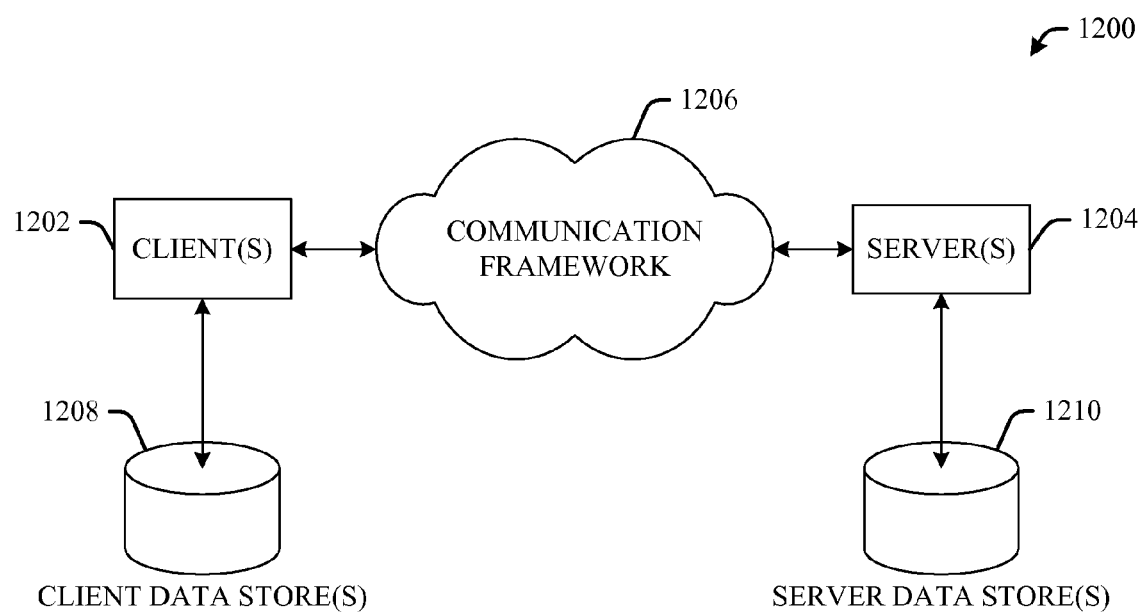
FIG. 12 illustrates a schematic block diagram of an exemplary computing environment in accordance with the subject innovation.

Referring now to FIG. 12, there is illustrated a schematic block diagram of an exemplary computing environment 1200 in accordance with the subject innovation. The system 1200 includes one or more client(s) 1202. The client(s) 1202 can be hardware and/or software (e.g., threads, processes, computing devices). The client(s) 1202 can house cookie(s) and/or associated contextual information by employing the innovation, for example.

The system 1200 also includes one or more server(s) 1204. The server(s) 1204 can also be hardware and/or software (e.g., threads, processes, computing devices). The servers 1204 can house threads to perform transformations by employing the innovation, for example. One possible communication between a client 1202 and a server 1204 can be in the form of a data packet adapted to be transmitted between two or more computer processes. The data packet may include a cookie and/or associated contextual information, for example. The system 1200 includes a communication framework 1206 (e.g., a global communication network such as the Internet) that can be employed to facilitate communications between the client(s) 1202 and the server(s) 1204.

Communications can be facilitated via a wired (including optical fiber) and/or wireless technology. The client(s) 1202 are operatively connected to one or more client data store(s) 1208 that can be employed to store information local to the client(s) 1202 (e.g., cookie(s) and/or associated contextual information). Similarly, the server(s) 1204 are operatively connected to one or more server data store(s) 1210 that can be employed to store information local to the servers 1204.

What has been described above includes examples of the innovation. It is, of course, not possible to describe every conceivable combination of components or methodologies for purposes of describing the subject innovation, but one of ordinary skill in the art may recognize that many further combinations and permutations of the innovation are possible. Accordingly, the innovation is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A system, comprising at least one processor coupled to at least one machine-readable storage medium storing instructions executable by the at least one processor to implement:
   a knowledge data set configured to identify a state of a provider;
   an analysis component configured to evaluate the knowledge data set;
   a change aggregator configured to enumerate a plurality of changes based upon the evaluation;
   a filter component configured to at least one of limit or reduce redundant changes in the plurality of changes; and
   a synchronization engine configured to manage a data flow between at least two providers based upon the knowledge data set, wherein the knowledge data set includes stand-in knowledge for providing in lieu of actual knowledge.

2. The system of claim 1, further comprising a knowledge generator configured to establish the knowledge data set based at least in part upon a state of one of the at least two providers.

3. The system of claim 1, wherein the knowledge data set includes actual knowledge that defines a state of a destination provider.

4. The system of claim 1, wherein the stand-in knowledge at least partly defines a state of a destination provider.

5. The system of claim 1, further comprising a machine learning and reasoning component configured to employ at least one of a probabilistic or a statistical-based analysis that infers an action-to be automatically performed.

6. A computer-implemented method, comprising:
   receiving a synchronization request for synchronizing data between at least two endpoints, wherein the request includes knowledge comprising actual knowledge and stand-in knowledge substituting for actual knowledge;
   in response to the request, enumerating a plurality of changes based at least in part upon the knowledge;
   filtering redundant changes based on the knowledge; and
   transmitting the plurality of changes between the at least two endpoints based at least in part upon the knowledge.

7. The method of claim 6, further comprising providing an identifier per unit of change associated with the plurality of changes.

8. The method of claim 6, further comprising filtering a subset from the plurality of changes as a function of the knowledge.

9. The method of claim 6, further comprising accepting a subset of the plurality of changes.

10. The method of claim 6, further comprising detecting a conflict between each of the plurality of changes and a local item.

11. The method of claim 10, further comprising:
resolving the conflict; and
accepting a subset of the plurality of changes as a function of the resolution.

12. The method of claim 11, further comprising logging the conflict.

13. The method of claim 6, further comprising:
monitoring a change associated with a source provider; and
prompting generation of the request based upon identification of the change associated with the source provider.

14. The method of claim 6, further comprising:
pinging a source provider to identify a change; and
prompting generation of the request based upon identification of the change associated with the source provider.

15. A computer-readable storage medium storing instructions, the instructions if executed by a computing device causing the computing device to perform operations comprising:
receiving knowledge that identifies a state of a destination provider;
enumerating a plurality of changes between a source provider and the destination provider based upon the knowledge;
synchronizing data between the source provider and the destination provider as a function of a subset of the enumerated changes; and
detecting and resolving a plurality of conflicts based upon a subset of the enumerated changes.

16. The machine-readable storage medium of claim 15, the operations further comprising applying filtering criteria to the plurality of changes.

17. The machine-readable storage medium of claim 15, the operations further comprising applying at least one enumerated change to at least one of the source provider or the destination provider.

* * * * *